(12) United States Patent
Park et al.

(10) Patent No.: US 7,412,157 B2
(45) Date of Patent: *Aug. 12, 2008

(54) LENS DRIVING DEVICE

(75) Inventors: Jae-Hyoung Park, Seoul (KR); Chang-Hyeon Ji, Seoul (KR); Man-Hyo Ha, Seoul (KR); Seoung-Hyok Kim, Gyeonggi-do (KR); Jong-Uk Bu, Gyeonggi-do (KR); Young-Joo Yee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 291 days.

This patent is subject to a terminal disclaimer.

(21) Appl. No.: 11/234,331

(22) Filed: Sep. 23, 2005

(65) Prior Publication Data

US 2006/0067666 A1    Mar. 30, 2006

(30) Foreign Application Priority Data

Sep. 24, 2004   (KR) .................... 10-2004-0077464

(51) Int. Cl.
*G03B 17/00* (2006.01)
*G03B 13/00* (2006.01)
(52) U.S. Cl. ........................ 396/79; 348/345
(58) Field of Classification Search .............. 396/75, 396/77, 79, 85; 348/345
See application file for complete search history.

(56) References Cited

U.S. PATENT DOCUMENTS

| 4,247,170 A | * | 1/1981 | Yamamoto ............... 359/705 |
| 4,920,369 A | * | 4/1990 | Kaneda et al. ............. 396/81 |
| 5,365,296 A | * | 11/1994 | Murakami et al. .......... 396/80 |
| 7,230,366 B2 | * | 6/2007 | Sasaki et al. ........... 310/323.17 |
| 2001/0015591 A1 | * | 8/2001 | Yoshida et al. ........... 310/313 B |
| 2004/0135470 A1 | * | 7/2004 | Iseki .................... 310/313 R |
| 2005/0067922 A1 | * | 3/2005 | Sasaki et al. ........... 310/323.09 |
| 2005/0236931 A1 | * | 10/2005 | Sakano et al. .......... 310/323.17 |
| 2006/0170307 A1 | * | 8/2006 | Ji et al. ................ 310/313 R |

FOREIGN PATENT DOCUMENTS

JP          11-285279         10/1999

* cited by examiner

*Primary Examiner*—Rodney E Fuller
(74) *Attorney, Agent, or Firm*—Lee, Hong, Degerman, Kang & Schmadeka

(57) ABSTRACT

A lens driving device includes a substrate which generates surface acoustic waves on its surface and a movable unit which is coupled to an optical lens and executes translation above the substrate using the surface acoustic waves. The lens driving device can implement translation of the lens without a separate mechanism, unlike the conventional driving devices using motors and screws, thereby satisfying the recent trend towards miniaturization and lightness to be used in a variety of industrial fields that use optical lenses.

20 Claims, 7 Drawing Sheets

LENS DRIVING DEVICE

CROSS REFERENCE TO RELATED APPLICATIONS

Pursuant to 35 U.S.C. § 119(a), this application claims the benefit of earlier filing date and right of priority to Korean Patent Application No. 10-2004-0077464, filed on Sep. 24, 2004, the content of which is hereby incorporated by reference herein in its entirety.

BACKGROUND OF THE INVENTION

1. Field of the Invention

The present invention relates generally to lens driving devices and, more particularly, to a lens driving device which is able to increase displacement without restriction, does not require a complex structure despite having a low power consumption, solves problems of friction and noise occurring in a gear mechanism, and realizes miniaturization and lightness, thus being easily applied to a variety of industrial fields that use optical lenses.

2. Description of the Related Art

Recently, with the development of communication technology and digital data processing technology, technology relating to portable terminals having various functions, such as data processing and calculation, communications, picture data input and output, etc., is gaining popularity. As examples, there are a PDA (portable digital assistant) which has a digital camera and a communication function, and a cellular phone which has a digital camera and a PDA function. According to the development of the digital camera technology and the data storage capacity, the installation of high performance digital camera modules is gathering strength.

Furthermore, according to the use of megapixel image sensors in digital camera modules which are installed in portable terminals, the importance of additional functions, such as auto focus and optical zoom functions, is further emphasized. In such a small digital camera module, to implement the auto focus and optical zoom functions, an actuator that occupies a relatively small volume and realizes a rapid actuating speed, low power consumption and large displacement is indispensable. In the case of a conventional magnetic actuator such as a VCM (voice coil motor), there is a technical limit in the increase in displacement, and there is a disadvantage in that power is continuously consumed while conducting a zoom function. In addition, in the case of an actuator such as a stepping motor, which rotates a lead screw in order to linearly move a movable unit, there are disadvantages of a complex mechanism and friction and noise due to a gear mechanism. Furthermore, in the case of the conventional actuators, which use the VCM motor and the stepping motor, it is difficult to manufacture the actuator at low cost and, as well, there is a limit to miniaturization.

SUMMARY OF THE INVENTION

Accordingly, the present invention has been made keeping in mind the above problems occurring in the prior art, and an object of the present invention is to provide a lens driving device which is able to increase displacement without restriction, does not require a complex structure despite having a low power consumption, solves problems of friction and noise occurring in a gear mechanism, and realizes miniaturization and lightness, thus being easily applied to a variety of industrial fields that use optical lenses.

In order to accomplish the above object, the present invention provides a lens driving device, including: a substrate to generate surface acoustic waves on a surface thereof; a movable unit coupled to an optical lens and executing translation on the substrate using the surface acoustic waves.

The lens driving device may further include a pair of interdigitating electrodes provided on respective opposite ends of the substrate.

The lens driving device may further include a pressure unit to apply pressure to both the movable unit and the substrate.

The pressure unit may include one selected from a combination of permanent magnets, a combination of a permanent magnet and a metal, and a combination of mechanical springs. The substrate may be made of one kind of material selected from among lithium niobate ($LiNbO_3$), lithium tantalite ($LiTaO_3$), and PZT material.

The movable unit may move in a direction opposite a propagation direction of the surface acoustic waves.

The lens driving device may further include a plurality of protrusions provided on a surface of the movable unit which contacts the substrate, thus preventing the movable unit from slipping while driving. The protrusions may be arranged in an array. Each protrusion may have one shape selected from a circular shape, a rhombic shape, a rectangular shape and a sine wave shape.

The lens driving device may further include a passage defined in the protrusions to ensure smooth air flow between the movable unit and the substrate, thus preventing damping due to air. The passage may be defined in a same direction as a driving direction of the movable unit.

The optical lens may include at least one lens conducting a zoom function. Furthermore, the optical lens may include at least one lens conducting an auto focus function.

The optical lens may be coupled to the movable unit by a connection unit.

The optical lens may include at least one zoom lens and at least one auto focus lens, and at least one first movable unit, coupled to the zoom lens, and at least one second movable unit, coupled to the auto focus lens, may be integrated on the same substrate.

BRIEF DESCRIPTION OF THE DRAWINGS

The above and other objects, features and advantages of the present invention will be more clearly understood from the following detailed description taken in conjunction with the accompanying drawings, in which:

FIG. 2b is a sectional view showing an interface between a substrate and a movable unit of the SAW linear motor of FIG. 2a;

DESCRIPTION OF THE PREFERRED EMBODIMENTS

Figure 1:
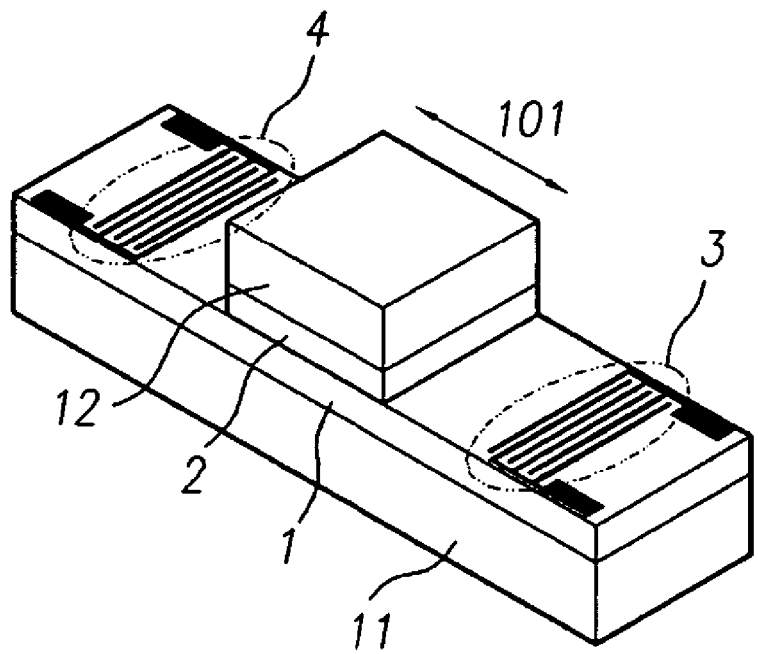
FIG. 1 is a perspective view of a SAW (surface acoustic wave) linear motor, according to an embodiment of the present invention.

Hereinafter, a preferred embodiment of the present invention will be described in detail with reference to the attached drawings. Reference now should be made to the drawings, in which the same reference numerals are used throughout the different drawings to designate the same or similar components. Furthermore, explanation of well-known functions and constructions will be omitted to more clearly describe the present invention.

The present invention provides a SAW (surface acoustic wave) linear motor, which is manufactured by a miniature machining technique or through a micro machining process, a lens driving device using the SAW linear motor, and an optical system for camera modules. The SAW linear motor of the present invention includes a substrate, which generates surface acoustic waves on a surface thereof, and a movable unit which is moved by the surface acoustic waves. The SAW linear motor may be manufactured in various structures according to the shape of the substrate and the movable unit and according to their assembly method. The optical system, which drives both an auto focus lens and a zoom lens using the SAW linear motor, is a representative field to which the present invention may be applied. These will be described in detail in the following embodiment of the present invention.

FIG. 1 is a perspective view of an example of a SAW linear motor serving as a lens driving device of the present invention. As shown in FIG. 1, a substrate 1, on which surface acoustic waves are generated, and a movable unit 2 are in close contact with each other at a predetermined pressure due both to an upper pressure unit 12, which is provided on the movable unit 2, and to a lower pressure unit 11, which is provided under the substrate 11.

Furthermore, interdigitating electrodes are provided on opposite ends of the substrate 1. When RF voltage is applied to the interdigitating electrodes, the movable unit 2 moves along with the upper pressure unit 12. The substrate 1 is not limited to special material, so long as surface acoustic waves are easily formed on the material of the substrate 1. For example, there is piezoelectric material, such as lithium niobate (LiNbO$_3$), lithium tantalite (LiTaO$_3$), material of a PZT substrate, etc. The movable unit 2 may be made of material of a semiconductor such as silicon, ceramic, metal or polymer. It is preferred that the movable unit 2 be made of material such that fine protrusions can be easily formed on a contact surface of the movable unit 2 which contacts the substrate 1. The pressure unit is a means for applying a predetermined pressure between the movable unit 2 and the substrate 1. If there is a separate component to press the movable unit 2, the pressure unit may be selectively used. In this embodiment, a magnet and a magnet, a magnet and a metal unit, or a metal unit and a magnet are respectively used as the upper pressure unit 12 and the lower pressure unit 11, so that a predetermined pressure can be applied to the movable unit 2 without a separate component.

Figure 2A:
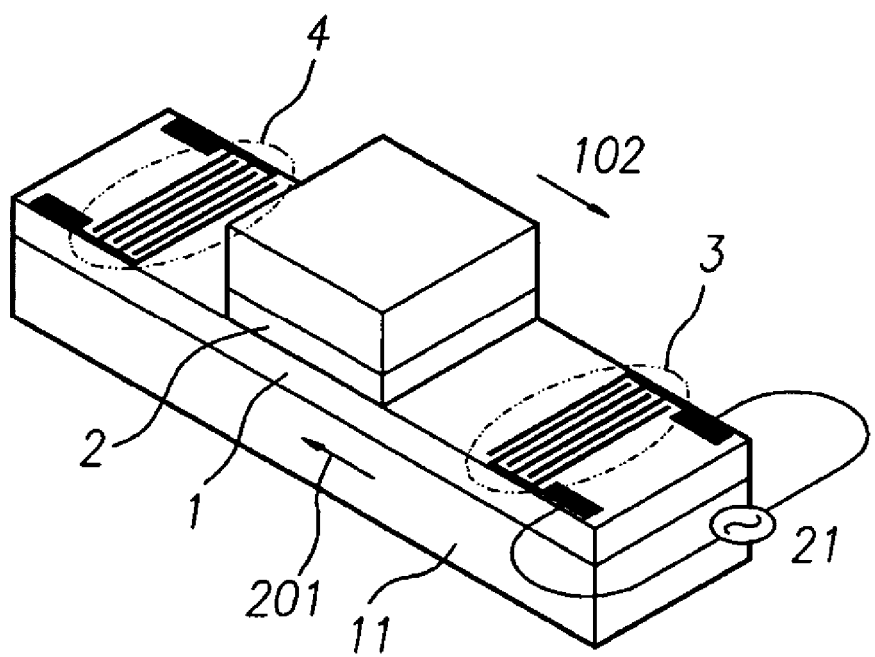
FIG. 2a is a perspective view showing the operation of the SAW linear motor of FIG. 1.

FIG. 2 is a schematic view showing a driving method and a principle of the SAW linear motor. As shown in FIG. 2a, the first interdigitating electrode 3 is connected to an RF power supply 21. When predetermined pulse voltage is applied to the first interdigitating electrode 3, surface acoustic waves are generated on the substrate 1. Then, the movable unit 2 moves in the direction 102 opposite the propagation direction 201 of the surface acoustic waves.

Figure 2B:
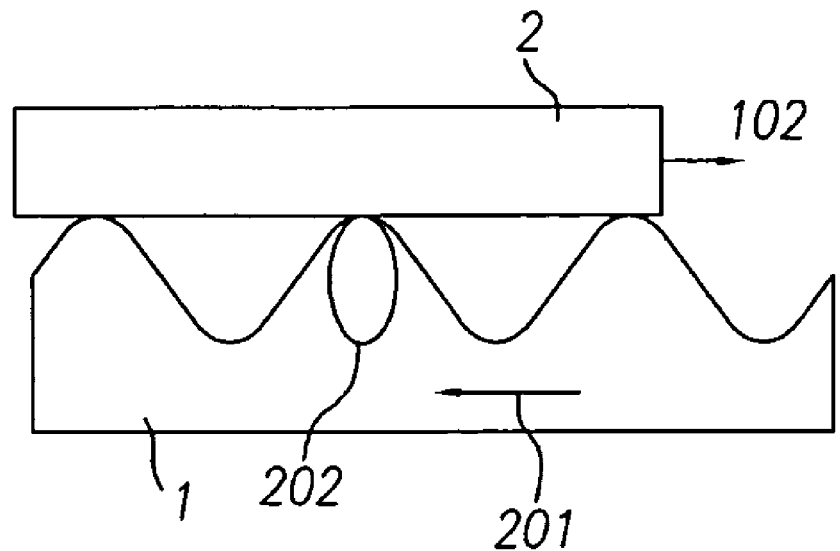

FIG. 2b is a schematic sectional view showing an enlargement of an interface between the movable unit 2 and the substrate 1. While the surface acoustic waves move to the left as designated by the arrow 201 of FIG. 2b, clockwise particle motion 202 occurs in the surface of the substrate 1. Thereby, the movable unit 2 is moved to the right as designated by the arrow 102. Therefore, to increase the efficiency of conversion of the particle motion using the surface acoustic waves into the translation of the movable unit 2, the pressure, which is applied to the movable unit 2 and the substrate 1 by the pressure units, and the shape of the contact surface of the movable unit 2, which contacts the substrate 1, must be optimized.

Figure 3A:
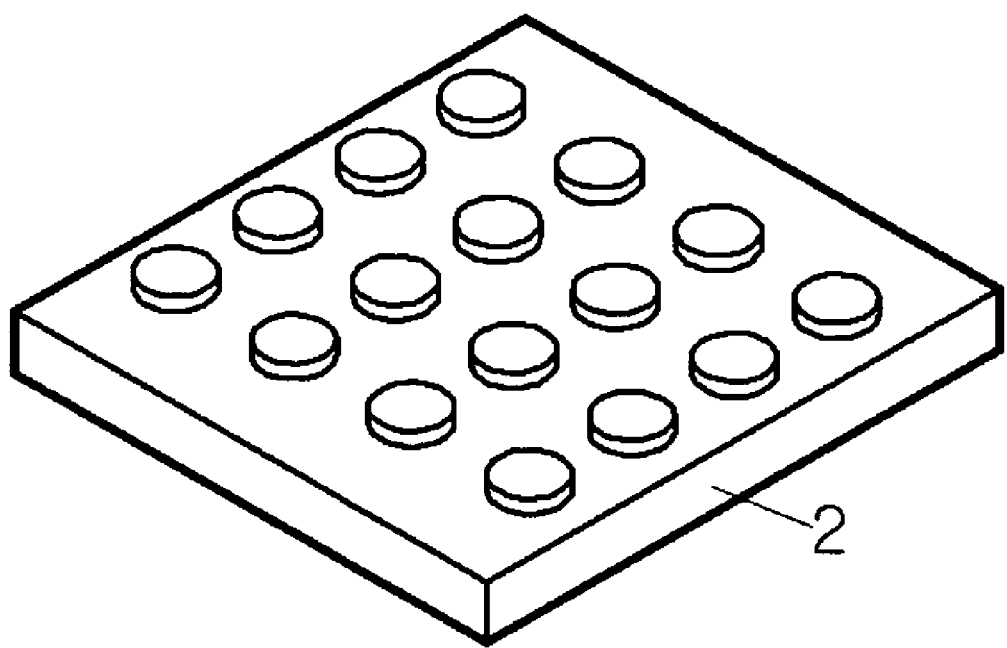
FIGS. 3a and 3e are views showing various shapes of protrusions formed on a contact surface of the movable unit constituting the SAW linear motor according to the present invention.
Figure 3B:
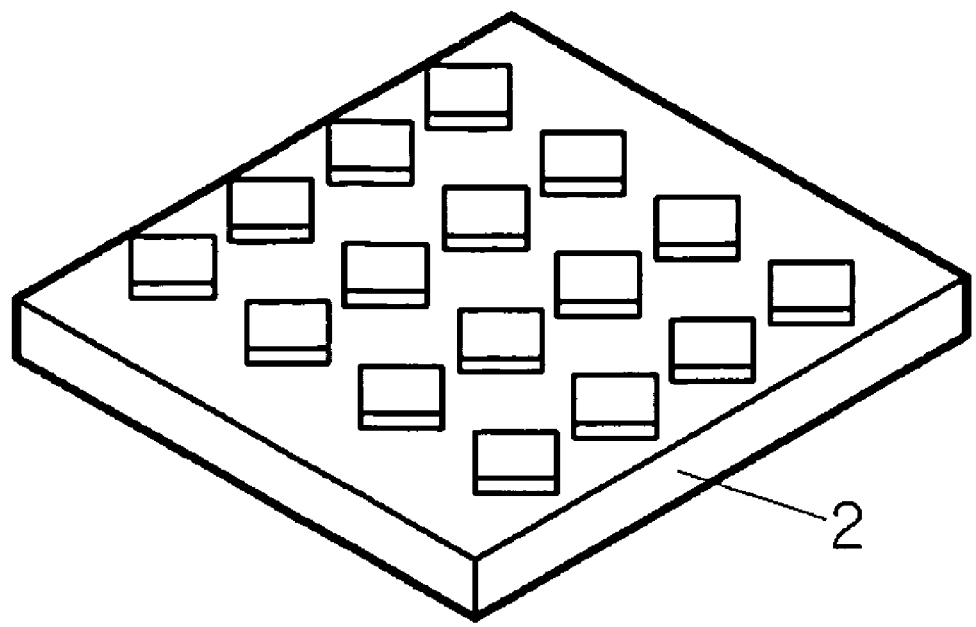
Figure 3C:
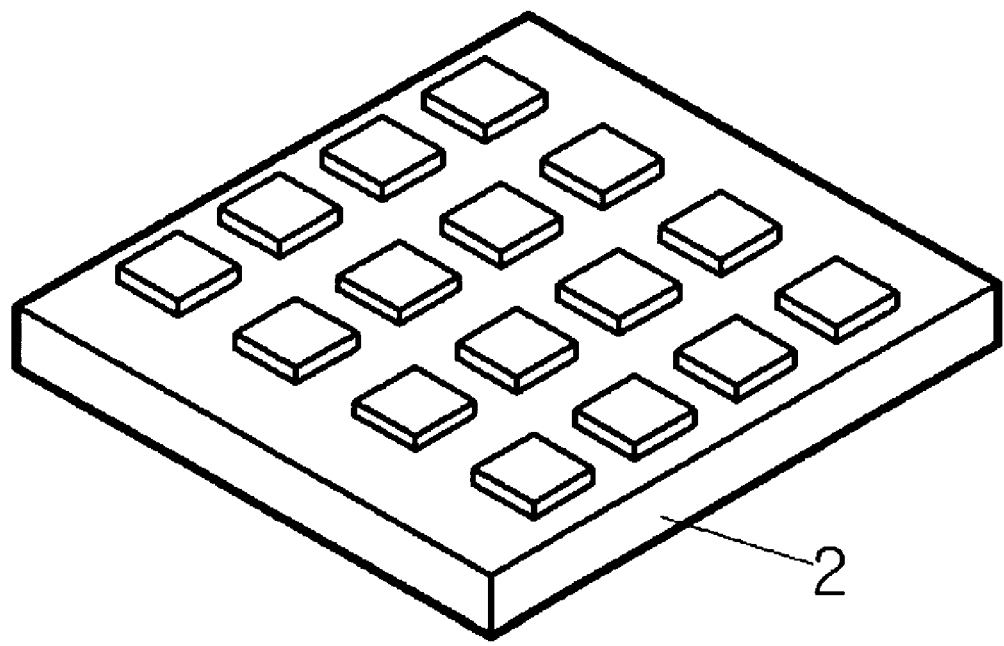
Figure 3D:
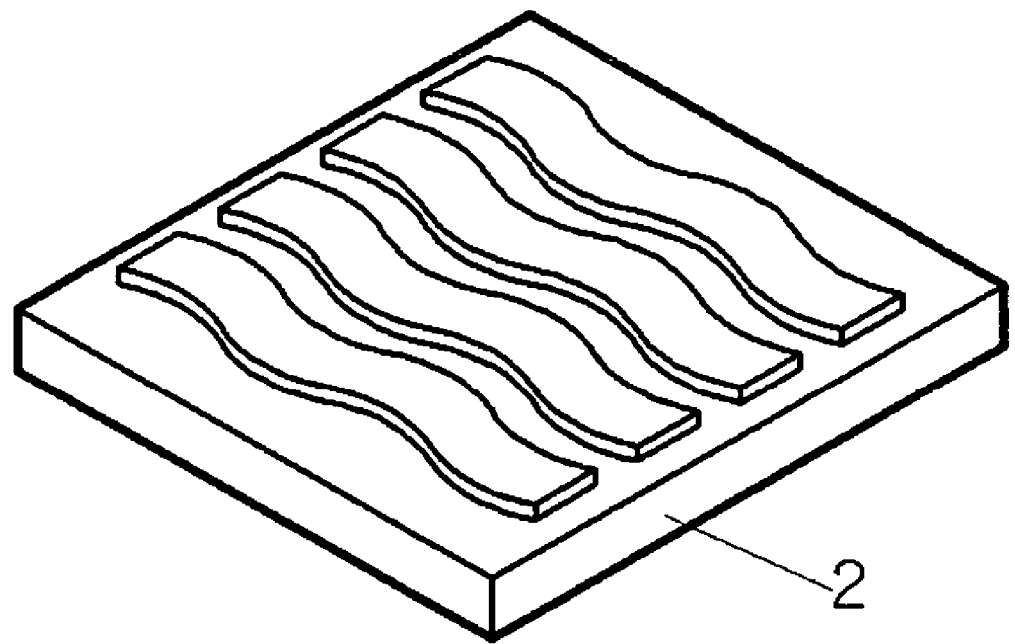
Figure 3E:
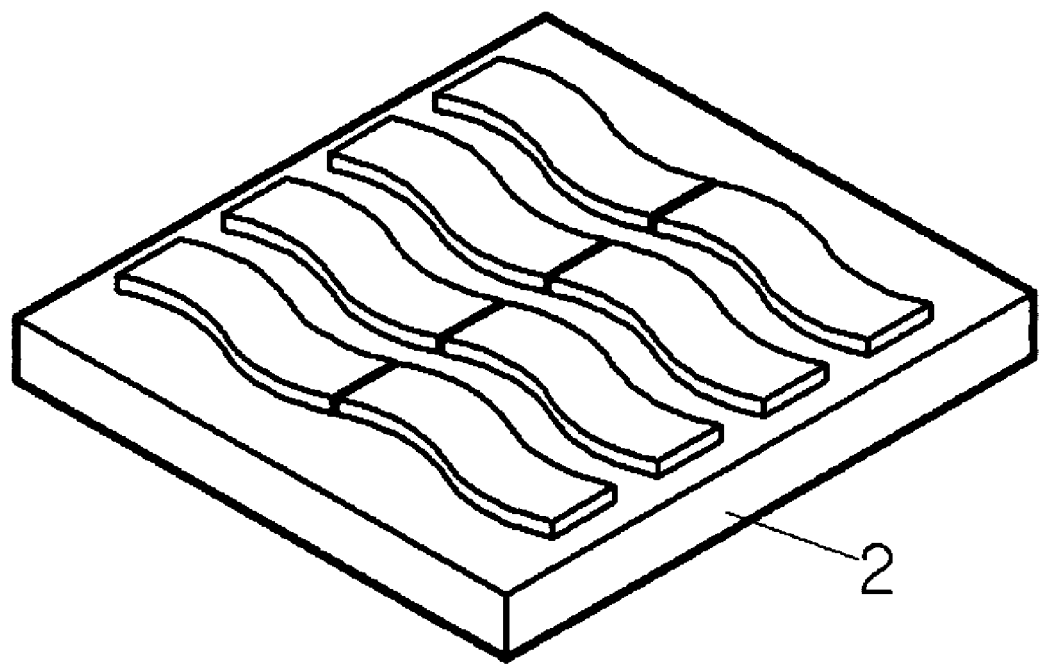

FIGS. 3a and 3e are views showing various practicable shapes of protrusions formed on the contact surface of the movable unit 2 which contacts the substrate 1. As shown in the drawings, the protrusions are arranged in an array, so that the pressure that is applied to the contact surface of the movable unit 2 is increased and the movable unit 2 is prevented from slipping while driving. Each protrusion may have a circular, rhombic, rectangular or sine wave shape. As shown in FIG. 3e, a passage may be defined in the protrusions such that air smoothly flows on the interface between the movable unit 2 and the substrate 1, thus preventing damping due to air. Preferably, the passage is defined in the same direction as the driving direction of the movable unit 2.

Figure 4:
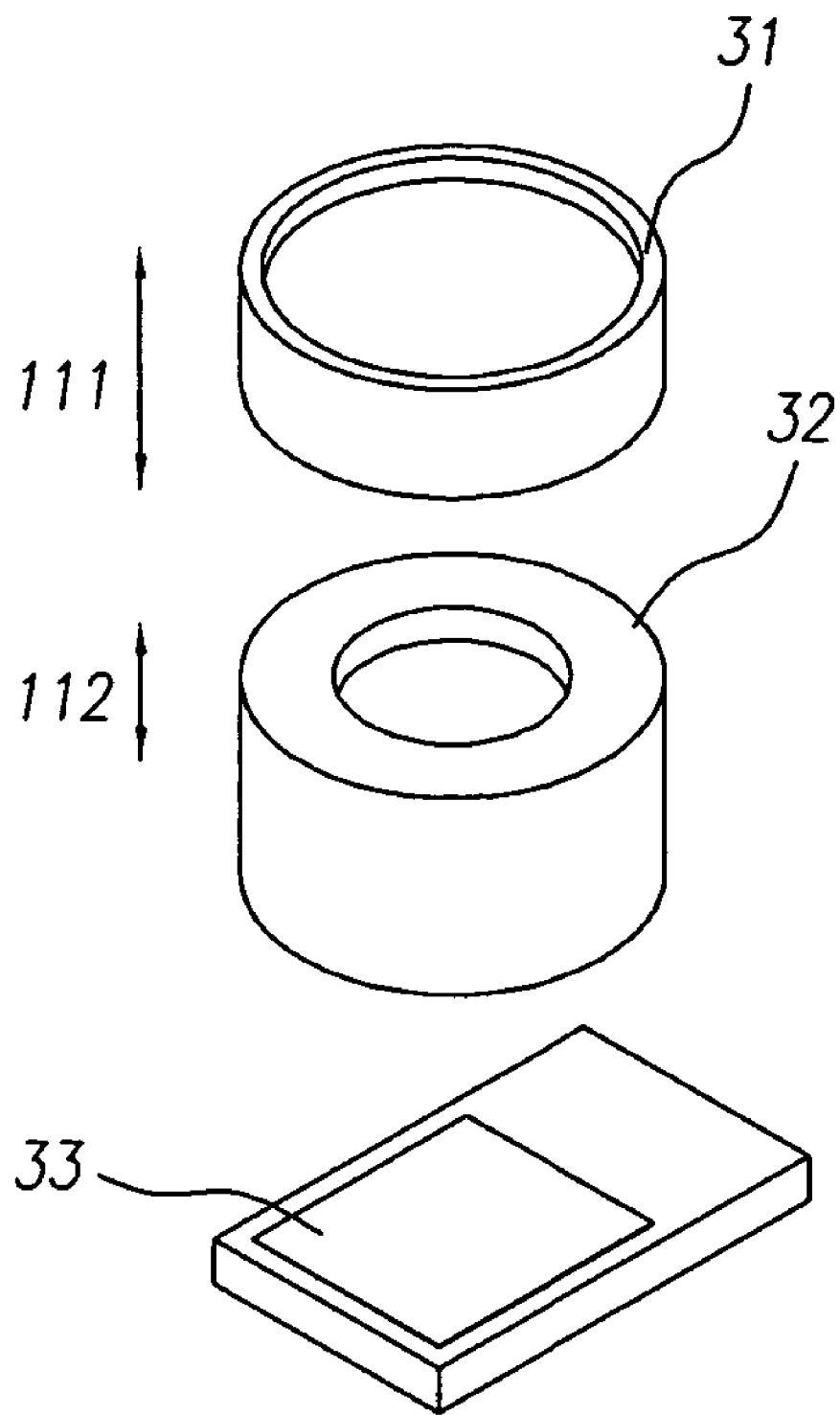
FIG. 4 is a schematic view of a two-group lens type optical zoom camera module, according to the present invention.

FIG. 4 is a schematic view of an optical zoom camera module which uses two lens units having both an optical zoom function and an auto focus function. When a zoom lens unit 31 is moved to a predetermined position to conduct the optical zoom function, an auto focus lens unit 32 is moved to a predetermined position determined by the position of the zoom lens unit 31, thus forming a picture on an image sensor 33. Typically, in two-group lens type optical zoom camera modules, zoom lens units require relatively large displacement, and auto focus lens units require rapid movement. The SAW linear motor of the present invention can be used as a lens driving device regardless of the kind of optical system.

Figure 5:
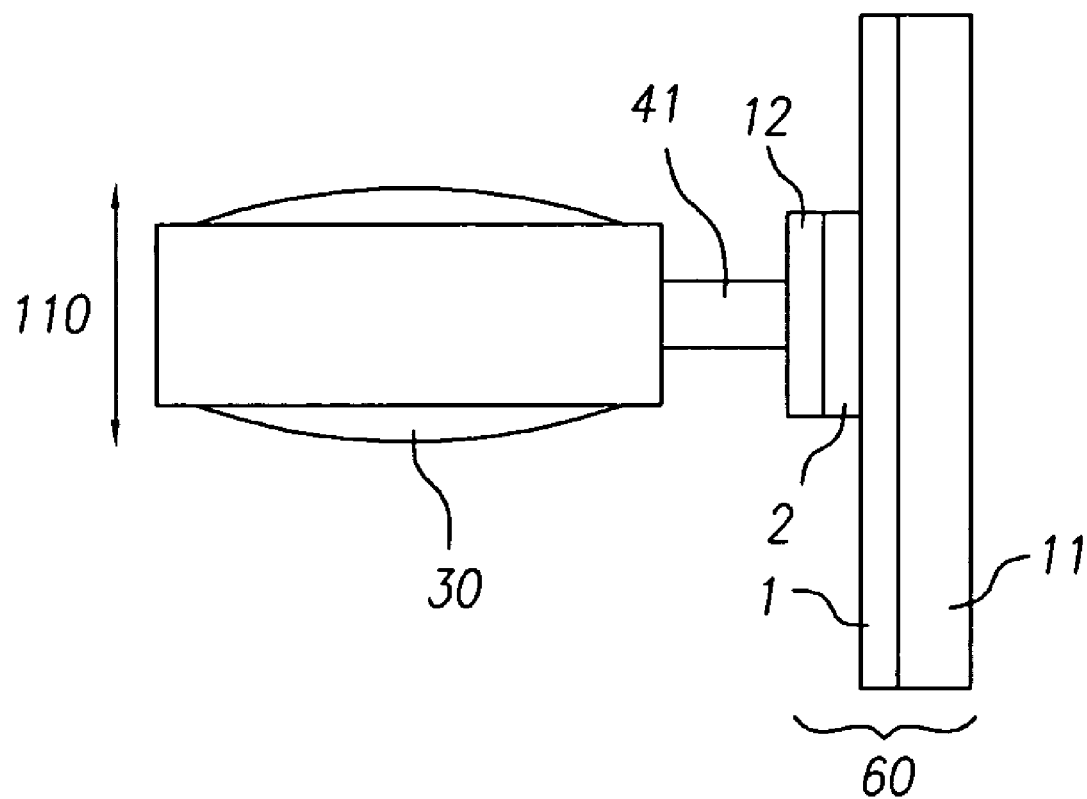
FIG. 5 is a schematic view of a lens driving device using the SAW linear motor, according to the present invention.

FIG. 5 is a schematic view of the lens driving device using the SAW linear motor 60 of the present invention. As shown in the drawing, a lens unit 30 is coupled to the movable unit 2 by a connection unit 41, such that a driving direction 110 of the lens unit 30 is the same as a driving direction of the movable unit 2. Here, the pressure units 11 and 12 may be selectively used. Alternatively, the movable unit 2 and the substrate 1 may be pressed towards each other by a spring, which is provided on the connection unit 41.

Figure 6:
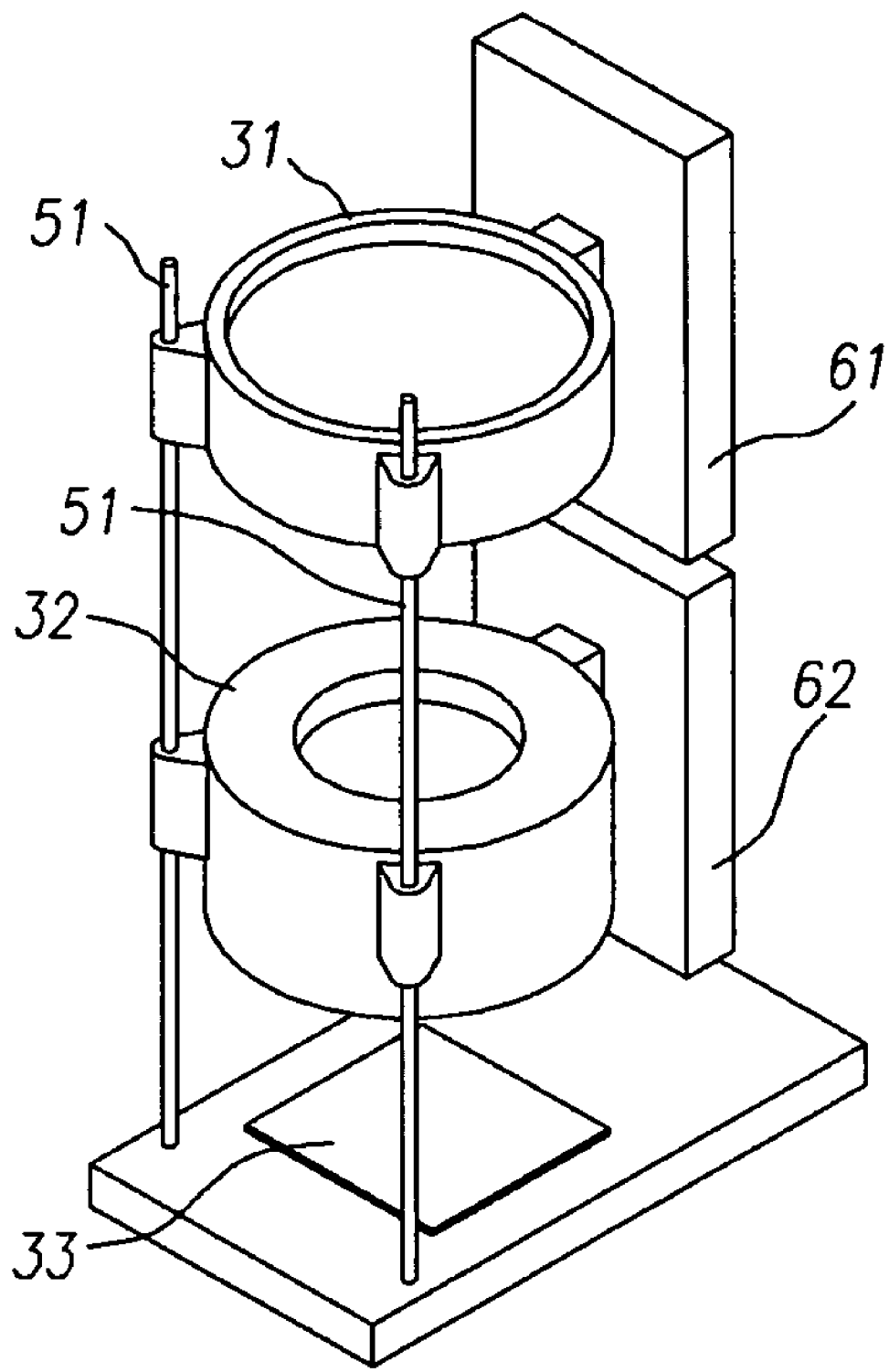
FIG. 6 is a perspective view showing an example of a two-group lens type optical zoom camera module using the SAW linear motor, according to the present invention.

FIG. 6 is a perspective view showing an example of a two-group lens type camera module 61, 62, which has zoom and auto focus functions and uses a SAW linear motor. A zoom lens unit 31 and an auto focus lens unit 32 are moved by respective SAW linear motors. As shown in the drawing, each of two SAW linear motors may be used as an independent package 61, 62 or, alternatively, they may be integrated in one package. In this case, it is preferable that a separate guide unit 51 be used for alignment of the lens units at their initial positions or when moved.

As described above, the present invention provides a lens driving device which can implement translation of a lens without a separate mechanism, unlike conventional driving devices using motors and screws. Furthermore, the present invention satisfies the recent trend of miniaturization and lightness, thus being used in a variety of industrial fields that use optical lenses.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A lens driving device, comprising:
   a substrate to generate surface acoustic waves on a surface of the substrate; and
   a movable unit coupled to an optical lens and executing translation on the substrate using the surface acoustic waves,
   wherein a plurality of protrusions which have a passage to ensure smooth air flow between the movable unit and the substrate and prevent damping due to air, are provided on a surface of the movable unit which contacts the substrate.

2. The lens driving device as set forth in claim 1, further comprising:
   a pair of interdigitating electrodes provided on respective opposite ends of the substrate.

3. The lens driving device as set forth in claim 1, further comprising:
   a pressure unit to apply pressure to both the movable unit and the substrate.

4. The lens driving device as set forth in claim 3, wherein the pressure unit comprises one selected from a combination of permanent magnets, a combination of a permanent magnet and a metal, and a combination of mechanical springs.

5. The lens driving device as set forth in claim 4, wherein the pressure unit comprises one selected from a combination of a permanent magnet and a metal and a combination of mechanical springs.

6. The lens driving device as set forth in claim 1, wherein the substrate is made of one of lithium niobate ($LiNbO_3$), lithium tantalite ($LiTaO_3$), and PZT material.

7. The lens driving device as set forth in claim 6, wherein the substrate is made of one of lithium tantalite ($LiTaO_3$) and PZT material.

8. The lens driving device as set forth in claim 1, wherein the movable unit moves in an opposite direction to a propagation direction of the surface acoustic waves.

9. The lens driving device as set forth in claim 1, wherein the protrusions are arranged in an array.

10. The lens driving device as set forth in claim 1, wherein each protrusion has one shape selected from a circular shape, a rhombic shape, a rectangular shape and a sine wave shape.

11. The lens driving device as set forth in claim 1, wherein the passage is defined in a same direction as a driving direction of the movable unit.

12. The lens driving device as set forth in claim 1, wherein the optical lens comprises at least one lens conducting a zoom function.

13. The lens driving device as set forth in claim 1, wherein the optical lens comprises at least one lens conducting an auto focus function.

14. The lens driving device as set forth in claim 1, wherein the optical lens is coupled to the movable unit by a connection unit.

15. The lens driving device as set forth in claim 14, wherein the connection unit comprises a spring.

16. The lens driving device as set forth in claim 1, wherein the optical lens comprises at least one zoom lens and at least one auto focus lens, and at least one first movable unit, coupled to the zoom lens, and at least one second movable unit, coupled to the auto focus lens, are integrated on the same substrate.

17. The lens driving device as set forth in claim 1, wherein the movable unit comprises one of silicon, ceramic, metal, and polymer.

18. The lens driving device as set forth in claim 1, further comprising:
   an upper pressure unit provided on the movable unit; and
   a lower pressure unit provided under the substrate,
   wherein the substrate and the movable unit are in close contact with each other at a predetermined pressure due to the upper and lower pressure units.

19. The lens driving device as set forth in claim 18, wherein an area of a surface of the upper pressure unit contacting the movable unit is same as an area of a surface of the movable unit contacting the upper pressure unit.

20. The lens driving device as set forth in claim 19, wherein an area of a surface of the lower pressure unit contacting the substrate is same as an area of a surface of the substrate contacting the lower pressure unit.

* * * * *